(12) United States Patent
Grabarnik et al.

(10) Patent No.: US 7,844,441 B2
(45) Date of Patent: Nov. 30, 2010

(54) COMPUTER-IMPLEMENTED METHOD, SYSTEM AND PROGRAM PRODUCT FOR APPROXIMATING RESOURCE CONSUMPTION OF COMPUTER SYSTEM

(75) Inventors: Genady Grabarnik, Scarsdale, NY (US); Moon Ju Kim, Wappingers Falls, NY (US); Lev Kozakov, Stamford, CT (US); Volodimir F. Lemberg, Ossining, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1283 days.

(21) Appl. No.: 11/390,527

(22) Filed: Mar. 27, 2006

(65) Prior Publication Data
US 2007/0226348 A1    Sep. 27, 2007

(51) Int. Cl.
| | |
|---|---|
| *G06F 1/02* | (2006.01) |
| *G06F 7/32* | (2006.01) |
| *G06F 7/60* | (2006.01) |
| *G06F 9/44* | (2006.01) |
| *G06F 13/10* | (2006.01) |
| *G06F 13/12* | (2006.01) |
| *G06F 15/18* | (2006.01) |
| *G06F 17/10* | (2006.01) |
| *G06F 17/15* | (2006.01) |
| *G06E 1/00* | (2006.01) |
| *G06E 3/00* | (2006.01) |
| *G06G 7/00* | (2006.01) |

(52) U.S. Cl. .................. 703/21; 703/2; 706/17; 708/274; 708/422; 708/520

(58) Field of Classification Search .............. 703/2, 703/13, 21; 706/17; 708/274, 422, 520
See application file for complete search history.

(56) References Cited

U.S. PATENT DOCUMENTS

| | | | |
|---|---|---|---|
| 3,702,006 A | 10/1972 | Page | |
| 4,056,846 A | 11/1977 | Callahan et al. | |
| 5,838,968 A | 11/1998 | Culbert | |
| 5,862,337 A | 1/1999 | Gray | |

(Continued)

OTHER PUBLICATIONS

Lingyun Yang, et al, "Statistical Data Reduction for Efficient Application Performance Monitoring", Argonne National Laboratory Technical Report, Aug. 2005, pp. 1-14.

(Continued)

*Primary Examiner*—George C Neurauter, Jr.
(74) *Attorney, Agent, or Firm*—William E. Schiesser; Hoffman Warnick LLC

(57) ABSTRACT

In general, the present invention provides a method, system and program product for approximating/estimating computer resource consumption of a computer system. Specifically, under the present invention, a more efficient or reduced computer work gradient matrix (hereinafter "matrix") is first built. This occurs by creating load measurements for a set of computer resource metrics of the computer system to analyze dependencies between different computer resource metrics. Then, a correlation matrix between the set of computer resource metrics is created based on the dependencies. The set of computer system resource metrics in the correlation matrix is thereafter clustered into a set of clusters, and a reduced matrix is built based thereon. Once the reduced matrix is built, it can be restored to a "full" matrix using linear transformation or the like.

16 Claims, 7 Drawing Sheets

U.S. PATENT DOCUMENTS

| | | | |
|---|---|---|---|
| 6,011,537 A | 1/2000 | Slotznick | |
| 6,061,761 A | 5/2000 | Bachmat | |
| 6,086,618 A | 7/2000 | Al-Hilali et al. | |
| 6,112,257 A | 8/2000 | Mason, Jr. et al. | |
| 6,189,022 B1 | 2/2001 | Binns | |
| 6,223,205 B1 | 4/2001 | Harchol-Balter et al. | |
| 6,247,173 B1 | 6/2001 | Subrahmanyam | |
| 6,301,603 B1 | 10/2001 | Maher et al. | |
| 6,330,719 B1 | 12/2001 | Zigmond et al. | |
| 6,338,072 B1 | 1/2002 | Durand et al. | |
| 6,338,089 B1 | 1/2002 | Quinlan | |
| 6,341,333 B1 | 1/2002 | Schreiber et al. | |
| 6,389,028 B1 | 5/2002 | Bondarenko et al. | |
| 6,415,027 B1 | 7/2002 | Malik | |
| 6,442,650 B1 | 8/2002 | Bachmat et al. | |
| 6,487,578 B2 | 11/2002 | Ranganathan | |
| 6,487,634 B1 | 11/2002 | Bachmat | |
| 6,574,587 B2 | 6/2003 | Waclawski | |
| 6,584,097 B1 | 6/2003 | Malik | |
| 6,601,084 B1 | 7/2003 | Bhaskaran et al. | |
| 6,606,661 B1 | 8/2003 | Agrawal et al. | |
| 6,618,742 B1 | 9/2003 | Krum | |
| 6,694,405 B2 | 2/2004 | Lam et al. | |
| 6,711,649 B1 | 3/2004 | Bachmat et al. | |
| 6,714,536 B1 | 3/2004 | Dowling | |
| 6,766,416 B2 | 7/2004 | Bachmat | |
| 6,766,419 B1 | 7/2004 | Zahir et al. | |
| 6,801,906 B1 | 10/2004 | Bates et al. | |
| 6,832,255 B1 | 12/2004 | Rumsewicz et al. | |
| 6,859,834 B1 | 2/2005 | Arora et al. | |
| 6,990,525 B1 | 1/2006 | Ying et al. | |
| 7,089,159 B2 * | 8/2006 | Hachiya | 703/2 |
| 7,296,056 B2 | 11/2007 | Yaung | |
| 7,305,471 B2 | 12/2007 | Odhner et al. | |
| 7,406,691 B2 | 7/2008 | Fellenstein et al. | |
| 7,441,244 B2 | 10/2008 | Longobardi | |
| 7,526,767 B1 | 4/2009 | Rhee et al. | |
| 7,716,151 B2 * | 5/2010 | Tiwari et al. | 706/45 |
| 2002/0004833 A1 | 1/2002 | Tonouchi | |
| 2002/0083342 A1 | 6/2002 | Webb et al. | |
| 2003/0018762 A1 | 1/2003 | Mullen | |
| 2003/0149717 A1 | 8/2003 | Heinzman | |
| 2004/0181794 A1 | 9/2004 | Coleman et al. | |
| 2005/0107997 A1 * | 5/2005 | Watts et al. | 703/21 |
| 2006/0130067 A1 * | 6/2006 | Grabarnik et al. | 718/104 |
| 2006/0253855 A1 | 11/2006 | Grabarnik et al. | |
| 2008/0262822 A1 * | 10/2008 | Hardwick et al. | 703/21 |

OTHER PUBLICATIONS

Chang-Shing Perng et al, "Data-driven Monitoring Design of Service Level and Resource Utilization", Integrated Network Management, 2005, IEEE International Symposium on Nice, France, May 15-19, 2005, Piscataway, NJ, USA, IEEE, May 15, 2005, pp. 89-101.

Ulrik Brandes et al, "Experiments on Graph Clustering Algorithms", Proc. 11th European Symposium Algorithms (ESA 2003), Sep. 19, 2003, pp. 568-571.

Ahituv et al., "A Model for Predicting and Evaluating Computer Resource Consumption", Communications of the ACM, Dec. 1988, vol. 31, No. 12, 7 pages.

Abdelzaher, "An Automated Profiling Subsystem for QoS-Aware Services", IEEE, 2000, 11 pages.

Grabarnik et al., U.S. Appl. No. 11/011,344, filed Dec. 14, 2004, Office Action Communication dated Dec. 24, 2009, 17 pages.

Grabarnik et al., U.S. Appl. No. 11/121,828, filed May 4, 2005, Office Communication dated Dec. 30, 2009, 18 pages.

Grabarnik et al., U.S. Appl. No. 11/011,344, filed Dec. 14, 2004, Notice of Allowance and Fee(s) Due dated Jul. 2, 2010, 18 pages.

Grabarnik et al., U.S. Appl. No. 11/121,828, filed May 4, 2005, Notice of Allowance and Fee(s) Due dated Jul. 6, 2010, 21 pages.

* cited by examiner

US 7,844,441 B2

COMPUTER-IMPLEMENTED METHOD, SYSTEM AND PROGRAM PRODUCT FOR APPROXIMATING RESOURCE CONSUMPTION OF COMPUTER SYSTEM

CROSS-REFERENCE TO RELATED APPLICATIONS

This application is related in some aspects to co-pending application Ser. No. 11/011,344, filed Dec. 14, 2004 and entitled "Method, System and Program Product for Approximating Resource Consumption of a Computer System," which is hereby incorporated by reference. This application is also related in some aspects to co-pending application Ser. No. 11/121,828, filed May 5, 2004 and entitled "Method, System and Program Product for Approximating Computer System Resource Consumption," which is hereby incorporated by reference.

FIELD OF THE INVENTION

In general, the present invention relates to the approximation/estimation of computer resource consumption. Specifically, the present invention relates to a method, system and program product for approximating resource consumption of a computer system using a reduced computer work gradient matrix.

BACKGROUND OF THE INVENTION

Resource utilization/consumption is one of the critical characteristics of any computing task. This is especially the case for a grid computing environment. In general, a vast quantity of computing power is often wasted due to the under-utilization of resources. To date, planning and sizing for computing requirements has typically been based on peak demand. However, statistically speaking, the actual resource utilization is usually on the order of 60% for the IBM S/390 (zSeries) machines, and under 10% for machines running the AIX operating system (AIX is a trademark of IBM Corporation, in the United States, other countries, or both) and machines having and Intel hardware (Intel, Intel logo, Intel Inside, Intel Inside logo, Intel Centrino, Intel Centrino logo, Celeron, Intel Xeon, Intel SpeedStep, Itanium, and Pentium are trademarks or registered trademarks of Intel Corporation or its subsidiaries in the United States and other countries). Harnessing the unutilized computing power can provide immediate economic benefits to any organization that has a large installed base of servers.

Grid infrastructure is defined as flexible, secure, coordinated resource sharing among a dynamic collection of individuals, institutions, and resources. It is distinguished from conventional distributed (enterprise) computing by its focus on large-scale resource sharing, innovative applications, and, in some cases, high-performance orientation. The collection of individual resources and institutions that contribute resources to a particular grid, and/or use the resources in that grid, is referred to as a virtual organization and represents a new approach to computing and problem solving based on collaboration among multiple disciplines in computation and data-rich environments. To add a resource under the grid infrastructure, current resource utilization information is needed. This is an important attribute of the "Grid Resource Manager," which allocates the resources within the grid based on the resource requirements of the application(s).

Another need for the approximation/estimation of computing resources is for the installation of software packages. Specifically, before installing a software package or application on a given computer, a user needs to know what resources (e.g., memory, CPU, etc.) will be required. Another important question is how much time and computing resources are needed to run a given task on a given machine with some other tasks and services running in the background. Usually, to find answers to these questions, users turn to the software documentation, which may contain a list of resource requirements, and, sometimes, application performance data. The problem is that such documentation data is only valid for one particular hardware/software configuration, and is difficult to apply to any other configuration. In addition, the performance data is usually obtained in an experiment when the given software task was running in parallel with other tasks and services. There is no easy way to estimate how much the performance data will change if the machine loading changes.

In view of the foregoing, there exists a need to overcome at least one of the deficiencies of the existing art.

SUMMARY OF THE INVENTION

In general, the present invention provides a method, system and program product for approximating/estimating computer resource consumption of a computer system. Specifically, under the present invention, a more efficient or reduced computer work gradient matrix (hereinafter "matrix") is first built. This occurs by creating load measurements for a set of computer resource metrics of the computer system to analyze dependencies between different computer resource metrics. Then, a correlation matrix between the set of computer resource metrics is created based on the dependencies. The set of computer system resource metrics in the correlation matrix is thereafter clustered into a set of clusters and a reduced matrix is built based thereon. Once the reduced matrix is built, it can be restored to a "full" matrix using linear transformation or the like.

Under the present invention, task work path(s) are also constructed by applying specific tasks to the computer system at a certain background loading level, and measuring the resource consumption of the computer system over time. Once the task work path(s) have been provided, they can be used in conjunction with either the reduced computer work gradient matrix or restored computer work gradient matrix to approximate the resource consumption of the computer system in response to a task applied at any background loading level.

A first aspect of the present invention provides a method for approximating resource consumption of a computer system, comprising: creating load measurements for a set of computer resource metrics of the computer system to analyze dependencies between different computer resource metrics; creating a correlation matrix between the set of computer resource metrics; clustering the set of computer resource metrics in the correlation matrix into a set of clusters; and building a reduced computer work gradient matrix based on the set of clusters.

A second aspect of the present invention provides a system for approximating resource consumption of a computer system, comprising: a system for creating load measurements for a set of computer resource metrics of the computer system to analyze dependencies between different computer resource metrics; a system for creating a correlation matrix between the set of computer resource metrics; a system for clustering the set of computer resource metrics in the correlation matrix into a set of clusters; and a system for building a reduced computer work gradient matrix based on the set of clusters.

A third aspect of the present invention provides a program product stored on a computer useable medium for approximating resource consumption of a computer system, the computer useable medium comprising program code for causing a computer system to perform the following steps: creating load measurements for a set of computer resource metrics of the computer system to analyze dependencies between different computer resource metrics; creating a correlation matrix between the set of computer resource metrics; clustering the set of computer resource metrics in the correlation matrix into a set of clusters; and building a reduced computer work gradient matrix based on the set of clusters.

A fourth aspect of the present invention provides a method for deploying an application for approximating resource consumption of a computer system, comprising: providing a computer infrastructure being operable to: create load measurements for a set of computer resource metrics of the computer system to analyze dependencies between different computer resource metrics; create a correlation matrix between the set of computer resource metrics; cluster the set of computer resource metrics in the correlation matrix into a set of clusters; and build a reduced computer work gradient matrix based on the set of clusters.

A fifth aspect of the present invention provides computer software embodied in a propagated signal for approximating resource consumption of a computer system, the computer software comprising instructions for causing a computer system to perform the following steps: creating load measurements for a set of computer resource metrics of the computer system to analyze dependencies between different computer resource metrics; creating a correlation matrix between the set of computer resource metrics; clustering the set of computer resource metrics in the correlation matrix into a set of clusters; and building a reduced computer work gradient matrix based on the set of clusters.

A sixth aspect of the present invention provides a business method for approximating resource consumption of a computer system.

Therefore, the present invention provides a method, system, and program product for approximating resource consumption of a computer system.

BRIEF DESCRIPTION OF THE DRAWINGS

These and other features of this invention will be more readily understood from the following detailed description of the various aspects of the invention taken in conjunction with the accompanying drawings in which.

Figure 1:
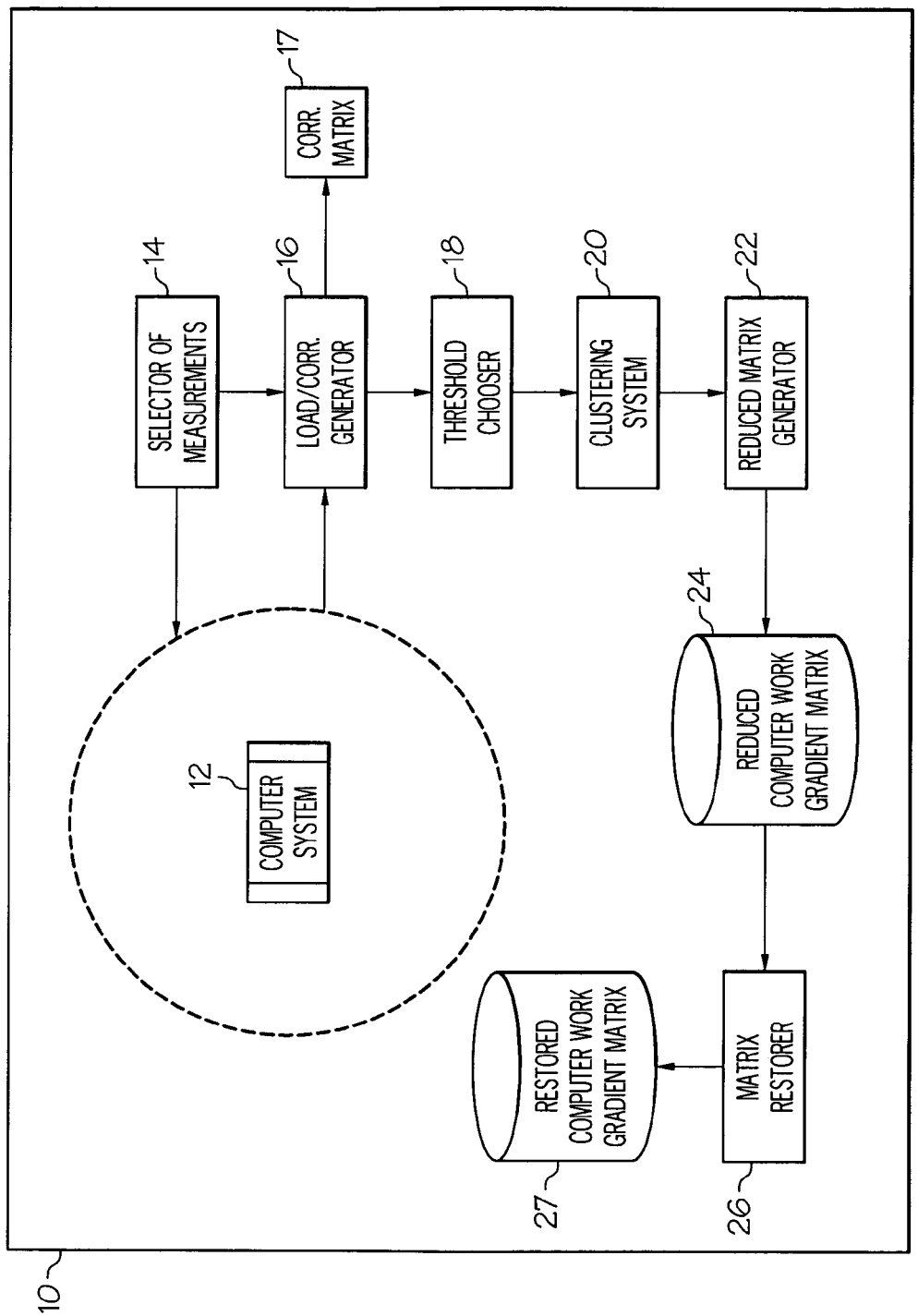
FIG. 1 depicts a system for building a computer work gradient matrix according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections:
I. General Description
  A. Computer Work Gradient Matrix
  B. Task Work Path
  C. Approximation of Resource Consumption
II. Computerized Implementation I. General Description The present invention provides a method, system and program product for approximating/estimating computer resource consumption of a computer system. Specifically, under the present invention, a more efficient or reduced computer work gradient matrix (hereinafter "matrix") is first built. This occurs by creating load measurements for a set of computer resource metrics of the computer system to analyze dependencies between different computer resource metrics. Then, a correlation matrix between the set of computer resource metrics is created based on the dependencies. The set of computer system resource metrics in the correlation matrix is thereafter clustered into a set of clusters and a reduced matrix is built based thereon. Once the reduced matrix is built, it can be restored to a "full" matrix using linear transformation or the like.

Under the present invention, task work path(s) are also constructed by applying specific tasks to the computer system at a certain background loading level, and measuring the resource consumption of the computer system over time. Once the task work path(s) have been provided, they can be used in conjunction with either the reduced computer work gradient matrix or restored computer work gradient matrix to approximate the resource consumption of the computer system in response to a task applied at any background loading level.

A. Computer Work Gradient Matrix

Under the present invention, the resource consumption of a computer system is approximated using, among other things, a computer work gradient matrix. As will be described herein, the computer work gradient matrix is built based on a clustering process that applies to various metrics of computing resources, such as CPU utilization, memory consumption, etc. The clustering process takes into account dependencies between different metrics, calculated as correlations between metrics based on results of experiments. The process significantly reduces the number of metrics that need to be included in the computer work gradient matrix calculation by replacing all highly dependent/correlated metrics with one most informative metric, and calculating other metrics in the same cluster using simple linear approximation. This way, the required amount of time and resources for computer work gradient matrix calculation is significantly reduced without affecting the quality of the final estimate of resource consumption.

The method reduces the time and resources required both for building the computer work gradient matrix and for approximating resource consumption by at least 2 to 10 times, depending on the required metrics. For example, assume a predefined increment of load level of 10%, meaning that 10 experiments are performed per metric/dimension. The total number of required experiments under previous embodiments is 10^10=10,000,000,000. However, suppose also that 6 out of the 10 metrics can be clustered into a single cluster, and 2 out of the other 4 metrics are clustered into another cluster. Under the present invention, all metrics in one cluster are replaced with only one most informative metric. In this case, the total number of non-correlated metrics is 4=10−5−1, and the number of needed experiments is reduced to 4^10 (1,048,576) in comparison to the 10,000,000,000 experiments needed in the prior art.

Figure 2:
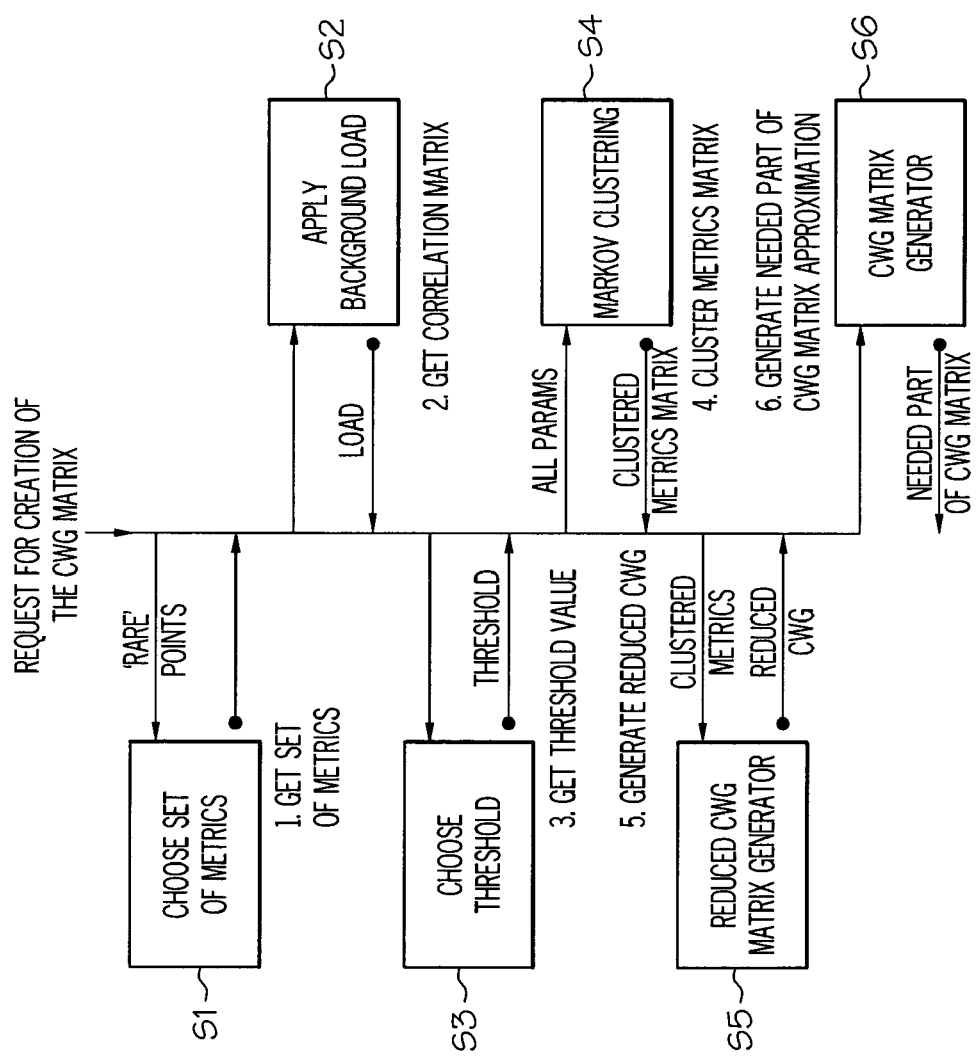
FIG. 2 depicts an illustrative flow diagram for building the computer work gradient matrix according to the present invention.

Referring now to FIGS. 1 and 2 collectively, the process of building a reduced computer work gradient matrix 24 in accordance with a typical embodiment of the present invention will be described in greater detail. In step S1, selector of measurements 14 will select a set (e.g., one or more) of computer resource metrics to be measured for computer system 12. In contrast to the above-incorporated patent applications, this set of computer resource metrics represents a smaller, more manageable (e.g., rare) set of points to be measured. Then, in step S2, load/correlation generator 16 will apply a (background) load to the set of computer resource metrics and take resulting measurements. This allows dependencies between different computing resource metrics to be determined. Based on the dependencies, load/correlation generator 16 will create a correlation matrix 17 between the computer resource metrics.

In step S3, threshold selector/chooser 18 will choose a correlation threshold value to transform correlation matrix 17 into a matrix of 0's and 1's, in such a way that most of the information contained in the low density load measurements is included in the transformed correlation matrix. The typical method allows finding the reasonable values of the correlation thresholds for various datasets, and is based on providing the special unified coefficient, which can serve as the criterion for the correlation threshold selection.

The selection of the threshold value under the present invention is based on the use of the Information Theory criteria on measuring of the uncertainty. To this extent, the establishing of the correlation threshold value is considered as the transformation of the "initial" statistical distribution $P(c)dc$ (where $c=|m(i,j)|$ are the absolute values of the correlation matrix $m(i,j)$, and $0<=c<=1$) to the "thresholded" (or rounded) two-state distribution $T(c)dc$ (where $T(1)=P1$, $T(0)=1-P1$, and $T=0$ for all other values of c). The calculated entropy value H is used as the criteria for such substitution $$H=\text{Sum}[-P(c)*\text{Log}(P(c))]$$

which is then normalized to the corresponding entropy value for the uniform distribution (where N is the total number of points, where the values of P(c) are taken)

$$H1=\text{Sum}[-(1.0/N)*\text{Log}(1.0/N)]=\text{Log}(N)$$

by the ratio $$R=(H/H1);\ 0<=R<=1$$

Then, the "normalized" entropy R values, calculated separately for both the "initial" and "thresholded" distributions are used. This condition guarantees that the "thresholded" distribution has exactly the same uncertainty ("normalized" to the uniform distribution value) in rounding to 0 or 1 as the "initial" distribution. This allows calculation of the value of the total entropy for the "initial" distribution R, and to match it against the analytical expression for the entropy of the "thresholded" distribution.

So, numerically solving the equation:

$$-X*\text{Log}(X)-(1.0-X)*\text{Log}(1.0-X)=R$$

and selecting the smaller of two roots for X as the P1 value, the equation for finding the actual correlation threshold value can be further established.

For that, the obtained value of (1.0−P1) is matched against the value of the cumulative distribution C(c) for the "initial" distribution, taken at the threshold point:

$$C(c)=1.0-P1,\text{ where }C(c)=\text{Probability}(0<=x=<c)=\text{Sum (for }0<=x<=c)P(x)$$

The value of the correlation threshold is obtained, numerically finding the (highest) root of this equation.

Once a threshold value has been selected, in step S4, clustering system 20 will cluster the set of computer resource metrics in the correlation matrix 17 into a set of clusters. Specifically, clustering system 20 will find connected components of the transformed correlation matrix 17 for the specific threshold value, as if the matrix represents a Markov chain and each metric represents a state in this chain. Then, clustering system 20 will put all connected components into one cluster.

In a typical embodiment, clustering system 20 will employ a Markov clustering technique as follows:

(a) Each step of Markov clustering consists of repetition of 2 operations:

(1) calculating a square of the matrix (M*M); and (2) replacing all non zero values above the threshold value in the resulting matrix with a value of 1.

This method is proven to converge in logarithmic time. After a logarithmic number of repetitions, the iterated matrix stops changing. Next, the following step is carried out:

(b) find all connected components (metrics). All connected components will be included in the same cluster.

Shown below are examples of different clustering results based on different threshold values:

Total Metrics: 33

1. Threshold Value: 0.95

Clusters: 14

Cluster Sizes: 1,1,1,1,3,1,1,2,1,3,1,3,1,13

Average Cluster Size=2.35

Average Cluster Size (Relative)=7.1%

Clusterization=42.5%

Reduction=57.5%

2. Threshold Value: 0.9

Clusters: 10

Cluster Sizes: 1,1,2,3,1,1,3,3,2,16

Average Cluster Size=3.3

Average Cluster Size (Relative)=10%

Clusterization=30.3%

Reduction=69.7%

3. Threshold Value: 0.85

Clusters: 7

Cluster Sizes: 1,3,3,1,1,3,21

Average Cluster Size=4.71

Average Cluster Size (Relative)=14.3%

Clusterization=21.2%

Reduction=78.8%

4. Threshold Value: 0.8

Clusters: 5

Cluster Sizes: 1,3,3,1,25

Average Cluster Size=6.6

Average Cluster Size (Relative)=20%

Clusterization=15.2%

Reduction=84.8%

5. Threshold Value: 0.75 (shows stabilization effect)

Clusters: 5

Cluster Sizes: 1,3,3,1,25

Average Cluster Size=6.6

Average Cluster Size (Relative)=20%

Clusterization=15.2%

Reduction=84.8%

Once the set of clusters are developed, reduced matrix generator 22 will identify a most informative metric in each cluster. To achieve this, the metric that has the maximum sum of correlation with other members of the cluster is typically identified as the most informative metric. Based on the most informative matrix from each cluster, reduced matrix generator 22 will then build a reduced computer work gradient matrix 24 in step S5. At this step, the method(s) described in either of the above-incorporated patent applications can be employed to build reduced computer work gradient matrix 24 only for the metrics chosen in the clusters. Shown below are details of such a method.

(1) A generator of background loading generates different loads of computer system 12 using predefined increments of load levels (e.g., 5%, 10%, . . . , 100%) for the chosen metric. In an illustrative embodiment, for 2 measurement coordinates, all possible loads will be pairs {(0.0,0.0),(0.0, 0.05), (0.0,0.1), . . . , (0.05, 0.0), (0.05, 0.05), . . . (1.0, 1.0)} that are measured in relative units (e.g., % of CPU cycles and % of Main Memory).

(2) For each level of load, a generator of elemental work increments generates additional permanent requests for resources of the same predefined size (e.g., request for number of CPU cycles generating 5% of CPU Utilization within 1 second under minimal load, and another request for 5% of Memory).

(3) For the load creation, a loading/resource consumption monitor controls the background load level of computer system 12.

(4) After incremental requests are generated, reduced matrix generator 22 obtains results of the measurements from the loading/resource consumption monitor showing how fast computer system 12 is able to provide requested resources. It then creates elements of reduced computer work gradient matrix 24 as a fraction/ratio of appropriate measurement (e.g., number of cycles generating 5% of CPU utilization within 1 second under minimal load to the time it took). In some cases, when computer system 12 is already running, for example, under 97% of CPU utilization, it is unable to provide proper resources, in this case the time needed to fulfill the request is set to infinity and an appropriate element of the reduced computer work gradient matrix 24 will be 0.

It should be understood that the systems described above for building reduced computer work gradient matrix 24 (e.g., a generator of background loading, a generator of elemental work increments, etc.) can be embodied within reduced matrix generator 22 or as separate systems (not shown). Regardless, in optional step S6, reduced computer work gradient matrix 24 can be restored to a full or restored computer work gradient matrix 27. by matrix restorer 26. Specifically, matrix restorer 26 can approximate computer work gradient matrix components as needed as a linear transformation of the reduced computer work gradient matrix 24 to yield restored/full computer work gradient matrix (hereinafter matrix 27).

B. Task Work Path

Figure 3:
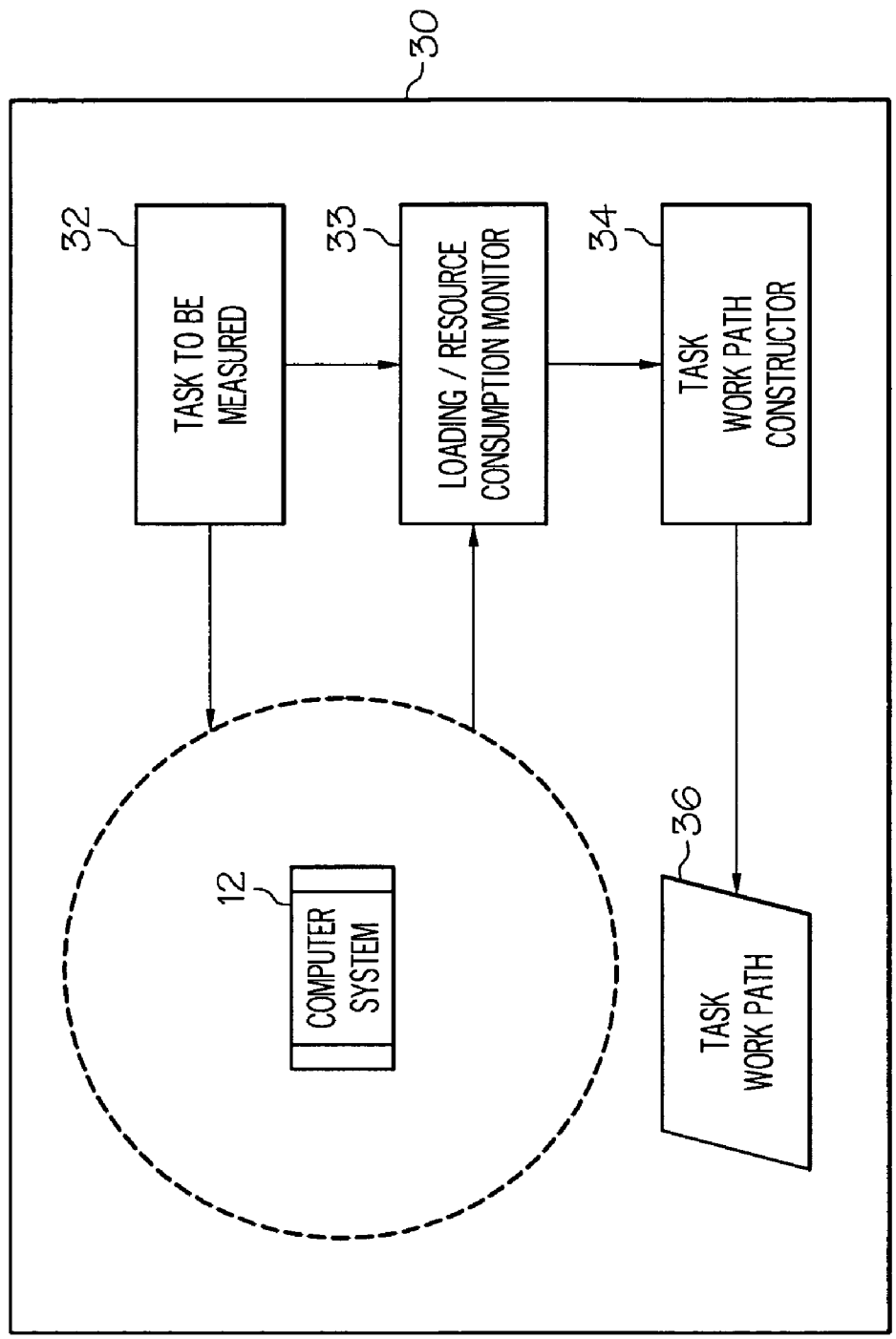
FIG. 3 depicts a system for constructing a task work path according to the present invention.

Referring now to FIG. 3, an illustrative system 30 for constructing a set (e.g., one or more) of task work paths 36 is shown in detail. A task work path 36 typically characterizes consumption levels of the resources in response to a computing task applied to computer system 12 at a particular/fixed background loading level (as a function of time). As shown in FIG. 3, a given computing task 32 starts/is applied to computer system 12. Loading/resource consumption monitor 33 measures current initial background loading levels, as well as all the changes in the loading/resource consumption during the task 32 execution. Task work path constructor 34 processes these measurements at small predefined time intervals, and constructs task work path 36 for the given initial background loading level(s).

This process is further illustrated below:

(1) Task 32 that should be measured is run on the computer system 12.

(2) Loading/resource consumption monitor 33 measures the computer system 12 resource consumption at an initial load.

(3) Loading/Resource consumption monitor 33 creates computer system 12 resources consumption snapshots at times with predefined increments (e.g., 5 seconds).

(4) Task work path constructor 34 uses computer system 12 resources snapshots to generate task work path 36 as a temporal path in the space of measurements.

Figure 4:
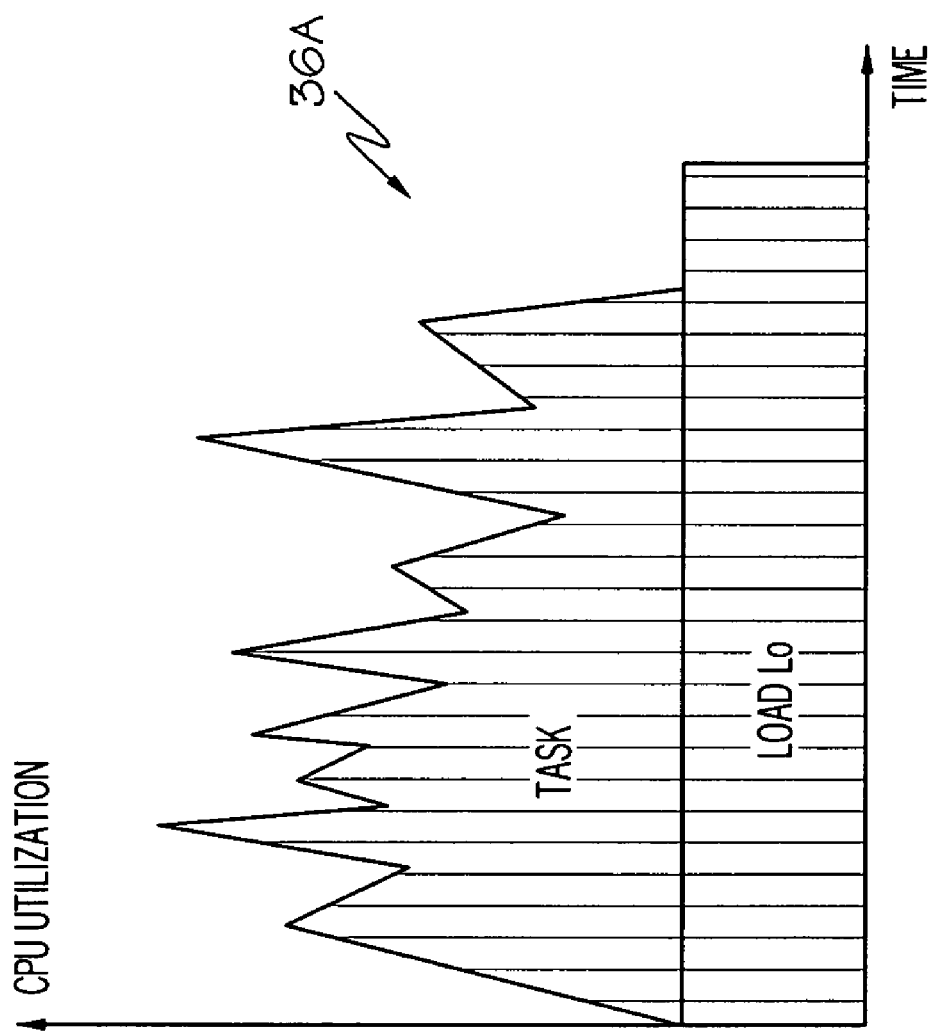
FIG. 4 depicts a first illustrative task work path according to the present invention.
Figure 5:
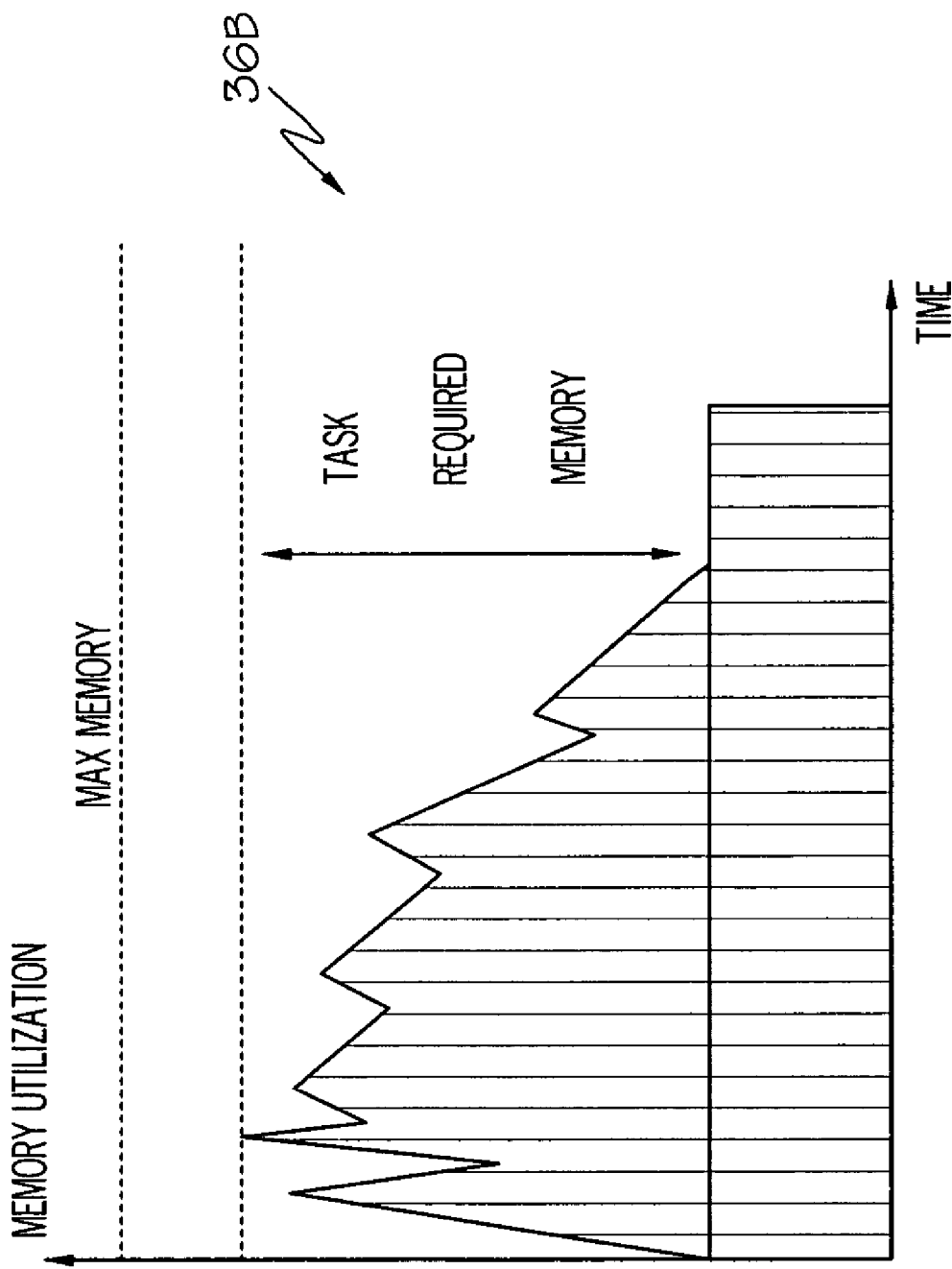
FIG. 5 depicts a second illustrative task work path according to the present invention.

Referring to FIGS. 4 and 5, illustrative task work paths 36A-B are shown. Specifically, FIG. 4 depicts a task path 36A for CPU utilization over time in response to the task 32 as applied to computer system 12 (FIG. 3) at a fixed level of background loading (Lo). FIG. 5 depicts a task path 36B for memory utilization over time in response to the same task 32 (FIG. 3).

C. Approximation of Resource Consumption

Figure 6:
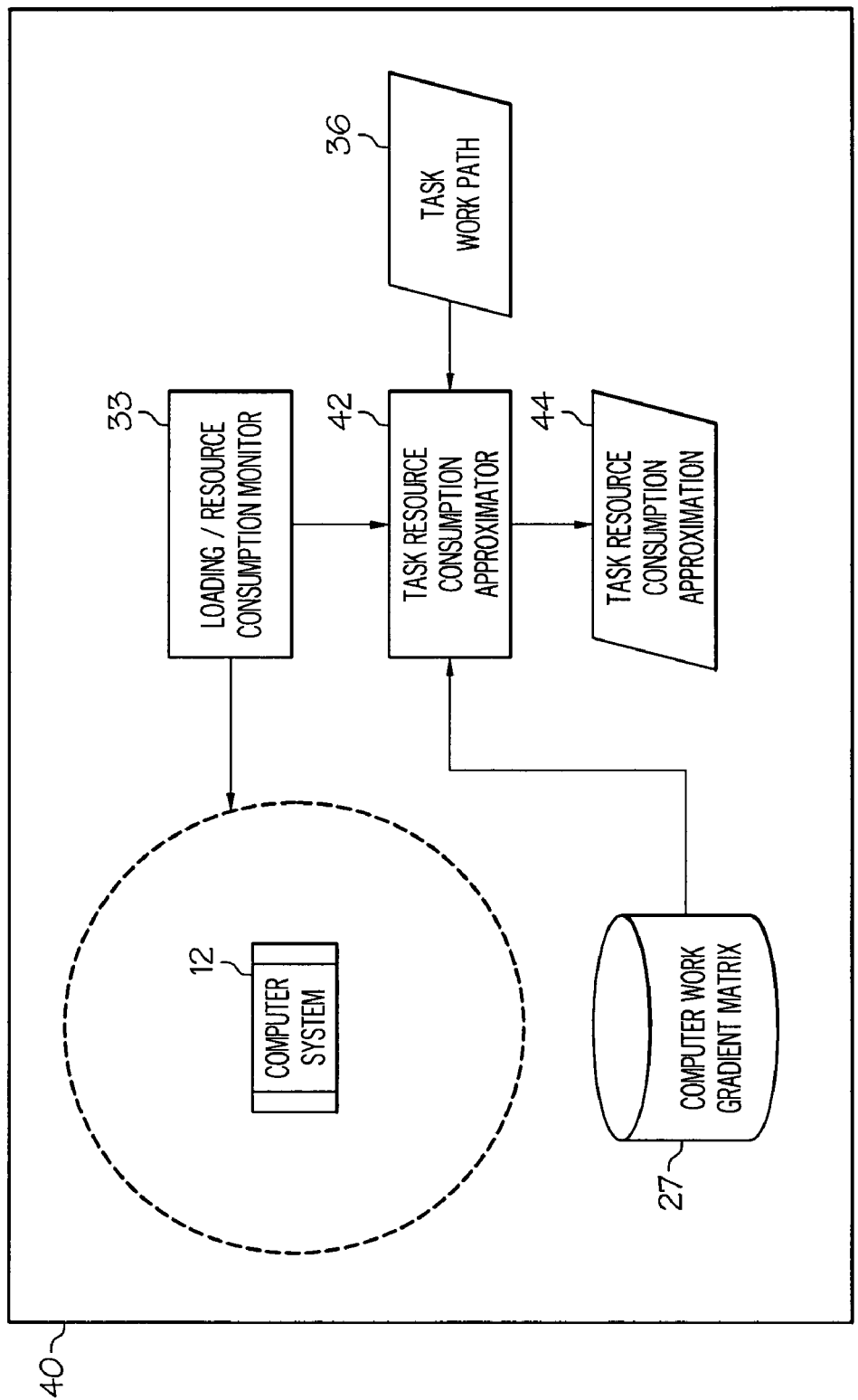
FIG. 6 depicts an illustrative system for approximating computer resource consumption using a computer work gradient matrix and task work path.

Once task work path(s) 36 have been provided as indicated above, they can then be used to approximate resource consumption for computer system 12 for a task at any background loading level. Referring now to FIG. 6, a system 40 for making this approximation is shown. Specifically, under system 40, loading/resource consumption monitor 33 measures the current background loading level, and passes the measurements to task resource consumption approximator 42. The task resource consumption approximator 42 then determines an approximation of the task resource consumption 44 by applying reduced matrix 24 (FIG. 1) or restored matrix 27 to appropriate elements along the task work path 36 in relation to the initial computer background loading levels, measured when the original task work path 36 was built.

This process is further illustrated below:

(1) Loading/resource consumption monitor 33 provides the level of the current background loading for computer system 12, which is where the task is to be run/applied.

(2) Task resource consumption approximator 42 loads the following information: current background loading of computer system 12 to be used for running the task, task work path 36 for the task to be run, matrix 24 or matrix 27 for computer system 12 where task is to be run.

(3) Task resource consumption approximator 42 uses one of the methods of approximation based on current system background loading, matrix 24 or matrix 27, and task work path 36 to calculate approximate resource consumption for the task.

(4) As an illustrative example of such an approximation, task resource consumption approximator 42 may perform the following operations:
- (A) Cut task work path 36 into elemental pieces such that each elemental piece is contained in 1 level of load (coordinates) for matrix 24 or matrix 27.
- (B) Scale each elemental piece of task work path 36 with an associated coefficient from matrix 24 or matrix 27.
- (C) Combine the results into new approximate task work path (not shown)—this new task work path will show resource/time consumption for the given system load.

(5) Store resulting approximate resource/time consumption 44.

Thus, by first developing matrix 24 or matrix 27, and task work path 36, the resource consumption for any task under any background loading level can be approximated under the present invention.

II. Computerized Implementation

Figure 7:
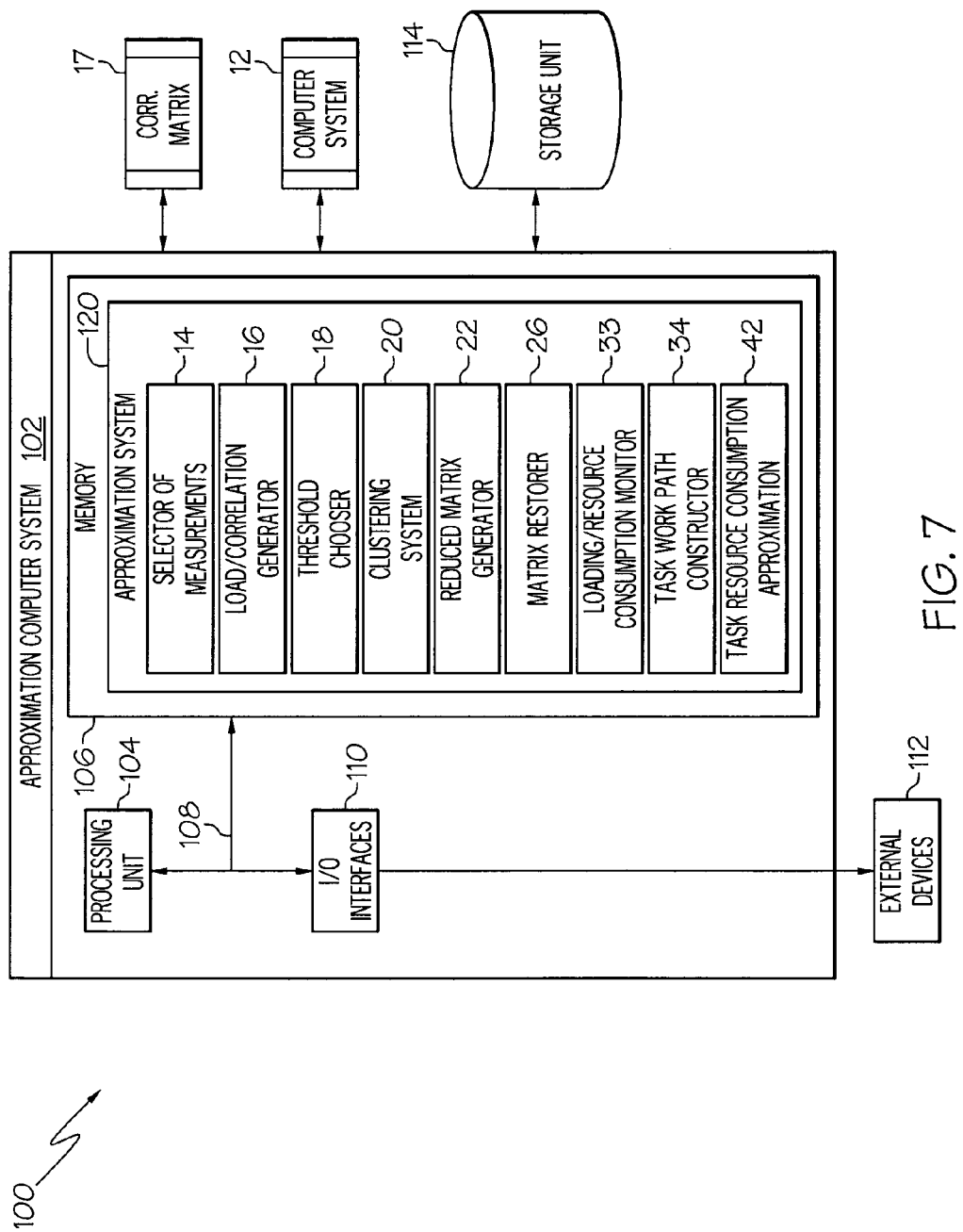
FIG. 7 depicts a more specific computerized implementation of the present invention.

Referring now to FIG. 7, a more specific computerized implementation 100 of the present invention is shown. As depicted, an approximation computer system 102 is provided, which is intended to represent any type of computer system capable of carrying out the teachings of the present invention. For example, approximation computer system 102 can be a desktop computer, a laptop computer, a workstation, a hand-held device, a client, a server, etc. To this extent, approximation computer system 102 can communicate with computer system 12 over a grid computing environment or a network such as the Internet, a local area network (LAN), a wide area network (WAN), a virtual private network (VPN), etc. Communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, approximation computer system 102 generally includes processing unit 104, memory 106, bus 108, input/output (I/O) interfaces 110, external devices/resources 112 and storage unit 114. Processing unit 104 may comprise a single processing unit, or be distributed across one or more processing units in one or more locations, e.g., on a client and server. Memory 106 may comprise any known type of data storage and/or transmission media, including magnetic media, optical media, random access memory (RAM), read-only memory (ROM), a data cache, a data object, etc. Moreover, similar to processing unit 104, memory 106 may reside at a single physical location, comprising one or more types of data storage, or be distributed across a plurality of physical systems in various forms.

I/O interfaces 110 may comprise any system for exchanging information to/from an external source. External devices/resources 112 may comprise any known type of external device, including speakers, a CRT, LED screen, hand-held device, keyboard, mouse, voice recognition system, speech output system, printer, monitor/display, facsimile, pager, etc. Bus 108 provides a communication link between each of the components in approximation computer system 102 and likewise may comprise any known type of transmission link, including electrical, optical, wireless, etc.

Storage unit 114 can be any type of system (e.g., a database) capable of providing storage for information (e.g., correlation matrix, reduced matrix, restored matrix, task work paths, approximations, etc.) under the present invention. As such, storage unit 114 could include one or more storage devices, such as a magnetic disk drive or an optical disk drive. In another embodiment, storage unit 114 includes data distributed across, for example, a local area network (LAN), wide area network (WAN) or a storage area network (SAN) (not shown). Although not shown, additional components, such as cache memory, communication systems, system software, etc., may be incorporated into approximation computer system 102. Moreover, although not shown, computer system 12 will likely include computerized elements similar to approximation computer system 102.

Shown in memory 106 of approximation computer system 102 is an approximation system 120. As depicted, approximation system 120 includes the components of the present invention described above, namely, selector of measurements 14, load/correlation generator 16, threshold chooser 18, clustering system 20, reduced matrix generator 22, matrix restorer 26, loading resource consumption monitor 33, task work path constructor 34, and task resource consumption approximator 42. These components generally perform the functions described above. Specifically, selector of measurements 14 will select (or be used by an administrator) to select a set of computer resource metrics of computer system 12. Load/correlation generator 16 will apply (background) load to the set of computer resource metrics and take resulting measurements. This allows dependencies between different computing resource metrics. Based on the dependencies, load/correlation generator 16 will create a correlation matrix between the computer resource metrics. Threshold chooser 18 will then select (or be used to select) a correlation threshold value to transform correlation matrix 17 into a matrix of 0's and 1's, in such a way that most of the information contained in the low density load measurements is included in the transformed correlation matrix. Based on the threshold value, clustering system 20 will cluster the set of metrics into a set of clusters, which will then be used by reduced matrix generator to build a reduced computer work gradient matrix (i.e., using a most informative metric in each cluster). As indicated above, matrix restorer can then optionally restore reduced matrix using linear transformation or a similar technique.

Regardless, loading/resource consumption monitor 33 measures the computer system 12 resource consumption as an initial load and then creates computer system 12 resources consumption snapshots at times with predefined increments (e.g., 5 seconds). Thereafter, task work path constructor 34 uses computer system 12 resources snapshots to generate task work path(s) as a temporal path in the space of measurements. Once task work path(s) and matrix (reduced or restored) are provided, they will be used by task resource consumption approximator 42 to approximate resource consumption of computer system 12.

While shown and described herein as a method and system for approximating resource consumption for a target computer system, it is understood that the invention further provides various alternative embodiments. For example, in one embodiment, the invention provides a computer-readable medium that includes computer program code to enable a computer infrastructure to approximate resource consumption for a target computer system. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 106 (FIG. 7) and/or storage system 114 (FIG. 7) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to approximate resource consumption for a target computer system as described above. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for approximating resource consumption for a target computer system. In this case, a computer infrastructure can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as one or more computer systems 12 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for approximating resource consumption of a computer system, comprising:
creating load measurements for a set of computer resource metrics of the computer system to analyze dependencies between different computer resource metrics;
creating a correlation matrix between the set of computer resource metrics;
clustering the set of computer resource metrics in the correlation matrix into a set of clusters;
building a reduced computer work gradient matrix based on the set of clusters;
constructing a set of task work paths that characterize consumption levels of a set of resources in response to a computing task applied to the computer system at a particular background loading level; and
approximating consumption levels of the set of resources for the computing task at any background loading level using the reduced computer work gradient matrix and the set of task work paths.

2. The method of claim 1, further comprising:
restoring the reduced computer work gradient matrix to a full computer work gradient matrix; and
approximating consumption levels of the set of resources for the computing task at any background loading level using the restored computer work gradient matrix and a set of task work paths.

3. The method of claim 1, wherein the clustering is a Markov clustering.

4. The method of claim 1, wherein the building step comprises:
identifying a set of most informative metrics in the set of clusters; and
building the reduced computer work gradient matrix based on the set of most informative metrics.

5. The method of claim 1, further comprising selecting a threshold value for the reduced computer work gradient matrix, wherein the threshold value is based on an uncertainty measure.

6. A system for approximating resource consumption of a computer system, comprising:
a memory;
a system for creating load measurements for a set of computer resource metrics of the computer system to analyze dependencies between different computer resource metrics;
a system for creating a correlation matrix between the set of computer resource metrics;
a system for clustering the set of computer resource metrics in the correlation matrix into a set of clusters;
a system for building a reduced computer work gradient matrix based on the set of clusters;
a system for constructing a set of task work paths that characterize consumption levels of a set of resources in response to a computing task applied to the computer system at a particular background loading level; and
a system for approximating consumption levels of the set of resources for the computing task at any background loading level using the reduced computer work gradient matrix and the set of task work paths.

7. The system of claim 6, further comprising a system for restoring the reduced computer work gradient matrix to a full computer work gradient matrix.

8. The system of claim 6, wherein the clustering is a Markov clustering.

9. The system of claim 6, wherein the system for building identifies a set of most informative metrics in the set of clusters, and builds the reduced computer work gradient matrix based on the set of most informative metrics.

10. The system of claim 6, further comprising a system for selecting a threshold value for the reduced computer work gradient matrix, wherein the threshold value is based on an uncertainty measure.

11. A program product stored on a computer useable storage medium including hardware for approximating resource consumption of a computer system, the computer useable medium comprising program code for causing a computer system to perform the following steps:
    creating load measurements for a set of computer resource metrics of the
    computer system to analyze dependencies between different computer resource metrics; creating a correlation matrix between the set of computer resource metrics;
    clustering the set of computer resource metrics in the correlation matrix into a set of clusters;
    building a reduced computer work gradient matrix based on the set of clusters;
    constructing a set of task work paths that characterize consumption levels of a set of resources in response to a computing task applied to the computer system at a particular background loading level; and
    approximating consumption levels of the set of resources for the computing task at any background loading level using the reduced computer work gradient matrix and the set of task work paths.

12. The program product of claim 11, wherein the computer useable storage medium including hardware further comprises program code for causing the computer system to perform the following step: restoring the reduced computer work gradient matrix.

13. The program product of claim 11, wherein the clustering is a Markov clustering.

14. The program product of claim 11, wherein the computer useable storage medium including hardware further comprises program code for causing the computer system to perform the following steps:
    identifying a set of most informative metrics in the set of clusters; and
    building the reduced computer work gradient matrix based on the set of most informative metrics.

15. The program product of claim 11, wherein the computer useable storage medium including hardware further comprises program code for causing the computer system to perform the following step: selecting a threshold value for the reduced computer work gradient matrix, wherein the threshold value is based on an uncertainty measure.

16. A method for deploying an application for approximating resource consumption of a computer system, comprising:
    providing a computer infrastructure being operable to:
    create load measurements for a set of computer resource metrics of the computer system to analyze dependencies between different computer resource metrics;
    create a correlation matrix between the set of computer resource metrics;
    cluster the set of computer resource metrics in the correlation matrix into a set of clusters;
    build a reduced computer work gradient matrix based on the set of clusters
    construct a set of task work paths that characterize consumption levels of a set of resources in response to a computing task applied to the computer system at a particular background loading level; and
    approximate consumption levels of the set of resources for the computing task at any background loading level using the reduced computer work gradient matrix and the set of task work paths.

* * * * *